(12) United States Patent
Chang et al.

(10) Patent No.: US 8,704,800 B2
(45) Date of Patent: Apr. 22, 2014

(54) PHOTO ELEMENT AND DRIVING METHOD THEREOF AND LIQUID CRYSTAL DISPLAY

(75) Inventors: Hung-Chang Chang, Taichung (TW); Yi-Chung Juan, Kaohsiung (TW); Chao-Hui Wu, Kaohsiung (TW)

(73) Assignee: Hannstar Display Corp., New Taipei (TW)

( * ) Notice: Subject to any disclaimer, the term of this patent is extended or adjusted under 35 U.S.C. 154(b) by 1007 days.

(21) Appl. No.: 12/771,202

(22) Filed: Apr. 30, 2010

(65) Prior Publication Data

US 2011/0063252 A1 Mar. 17, 2011

(30) Foreign Application Priority Data

Sep. 17, 2009 (TW) .............................. 98131369 A (51) Int. Cl.
*G06F 3/042* (2006.01)

(52) U.S. Cl.
USPC ............................. 345/175; 345/92; 345/207

(58) Field of Classification Search
USPC .................... 345/87–104, 204–215, 173–179
See application file for complete search history.

(56) References Cited

U.S. PATENT DOCUMENTS

| | | | | |
|---|---|---|---|---|
| 7,812,811 | B2 * | 10/2010 | Shih et al. ...................... | 345/104 |
| 8,063,877 | B2 * | 11/2011 | Shih et al. ...................... | 345/104 |
| 2007/0146282 | A1 * | 6/2007 | Choo et al. ...................... | 345/98 |
| 2007/0290971 | A1 * | 12/2007 | Shih et al. ...................... | 345/90 |

* cited by examiner

*Primary Examiner* — Vijay Shankar
(74) *Attorney, Agent, or Firm* — Huffman Law Group, P.C.

(57) ABSTRACT

A photo element includes a capacitor, a switch thin film transistor (TFT), a charge thin film transistor, and a photo thin film transistor. A voltage is charged to the capacitor through the charge TFT, and the output voltage of the capacitor is read through the readout line. The photo-induced current will affect the output voltage of the capacitor; therefore it is employed to determine whether the photo element is touched. Later, a reverse-biased voltage is applied to the photo TFT, such that the threshold voltage and sensitivity of the photo TFT can be maintained.

12 Claims, 10 Drawing Sheets

PHOTO ELEMENT AND DRIVING METHOD THEREOF AND LIQUID CRYSTAL DISPLAY

BACKGROUND OF THE INVENTION

1. Field of the Invention

The present invention relates to a Liquid Crystal Display, and more particularly, to a Liquid Crystal Display with in-cell touch panel.

2. Description of the Prior Art

One type of touch panel, "In-cell touch panel," comprises many photo elements capable of sensing the light and thus inducing photo-induced currents. By sensing the variance of the photo-induced current, the coordinates of the user's touched points can be determined.

Figure 1:
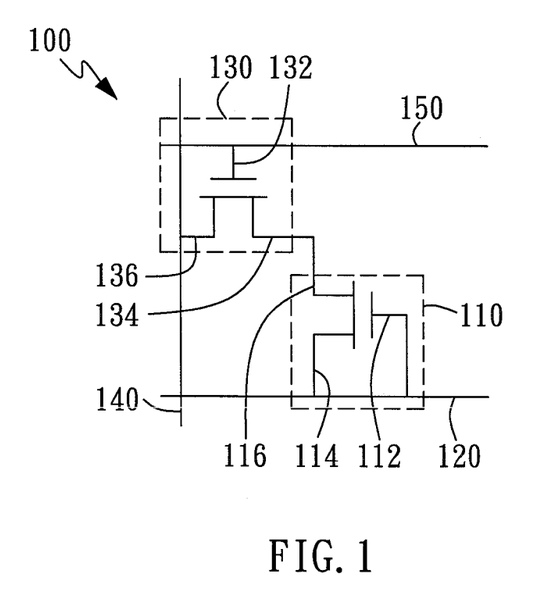
FIG. 1 is a diagram of a conventional photo element.

FIG. 1 shows a conventional photo element 100 of an In-cell touch panel. The photo element 100 comprises a photo thin-film transistor 110 and a switch thin-film transistor 130. The source 136 of the switch thin-film transistor 130 is connected to a readout line 140; the gate 132 of the switch thin-film transistor 130 is connected to a switch line 150; the drain 134 of the switch thin-film transistor 130 is connected to the source of the photo thin-film transistor 110. Further, The gate 112 and drain 114 of the photo thin-film transistor 110 are connected to a bias line 120, which provide voltages to the photo thin-film transistor 110. When the switch thin-film transistor 130 is opened after receiving a voltage given by the first switch line 150, a photo-induced current generated by the photo thin-film transistor 110 will be transmitted through the switch thin-film transistor 130 and read out via the readout line 140. Generally, the value of the photo-induced current is proportional to the illumination of the light illuminated on the photo thin-film transistor 110. When the user touches the touch panel by a finger or using a light pen to illuminate the touch panel, the illumination of the light of the touch site will be decreased or increased. Thus the value of the photo-induced current is changed, and therefore the point of the touch event can be determined.

The In-cell touch panel is arranged in the thin-film transistor substrate, which includes a pixel array. Some pixels of the pixel array are regularly embedded with an above-mentioned photo element 100 and thus readout pixels are formed.

Figure 2:
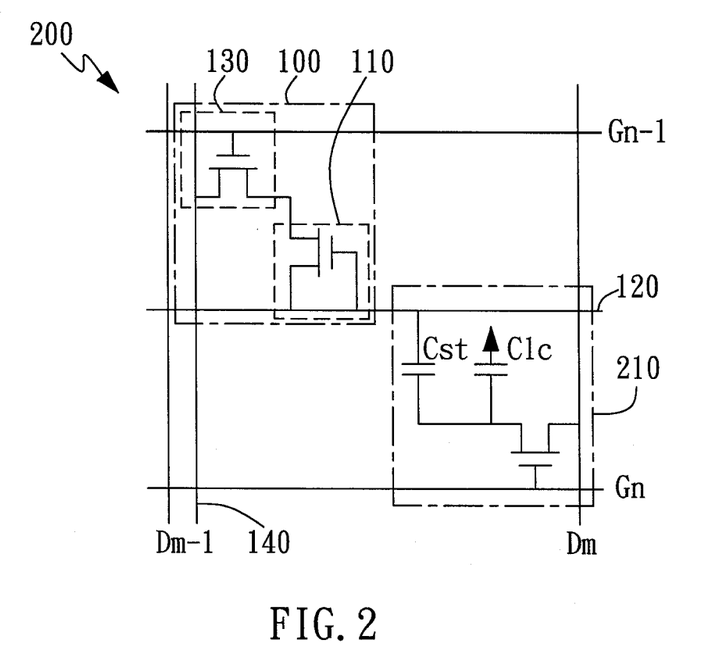
FIG. 2 is a diagram of a conventional readout pixel that includes the conventional photo element.

FIG. 2 shows a conventional readout pixel 200. The readout pixel 200 comprises a pixel element 210 and an above-mentioned photo element 100. A bias line 120 is employed for not only providing a reference voltage to the storage capacitor Cst of the pixel element 210 but also providing a voltage to drive the photo-induced current to be read out. In addition, the switch line 150 of FIG. 1 corresponds to scan lines Gn-1, Gn of FIG. 2 and Dm-1, Dm denote data lines for providing voltages written to the pixel element 120.

Under operation, the switch thin-film transistor 130 of the photo element 100 is typically shadowed but the photo thin-film transistor 110 of the photo element 100 is illuminated; therefore, after a long-term illumination, the reliability of the photo element 100 will be decreased, the sensitivity will be reduced, and the value of the photo-induced current will be decayed. The worse decay of the photo-induced current reduces the signal to noise (S/N) ratio and may result in incorrect point of touch event to be determined. Hence, the reliability of the photo element 100 after a long-term illumination is an important issue.

Figure 3:
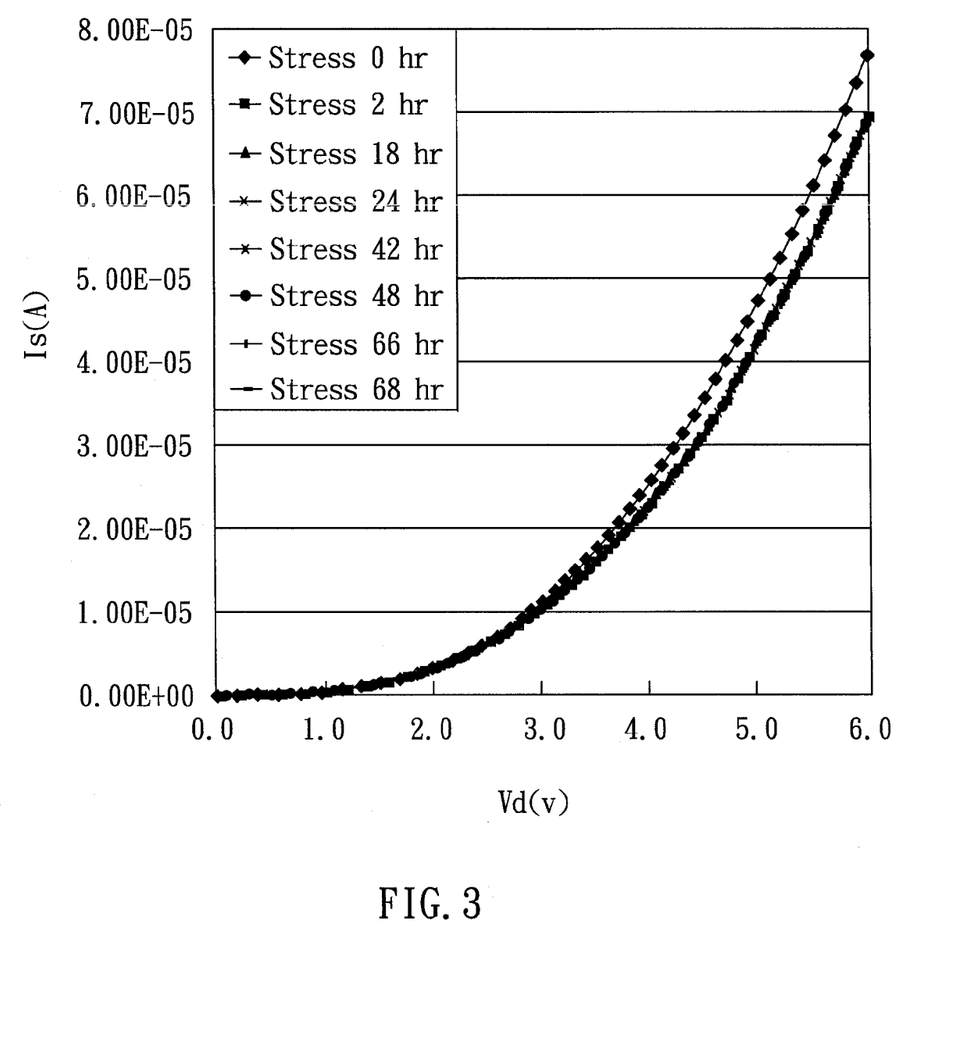
FIG. 3 shows an I-V curve of a photo element when the photo element is operated at dark state after variant period of times.
Figure 4:
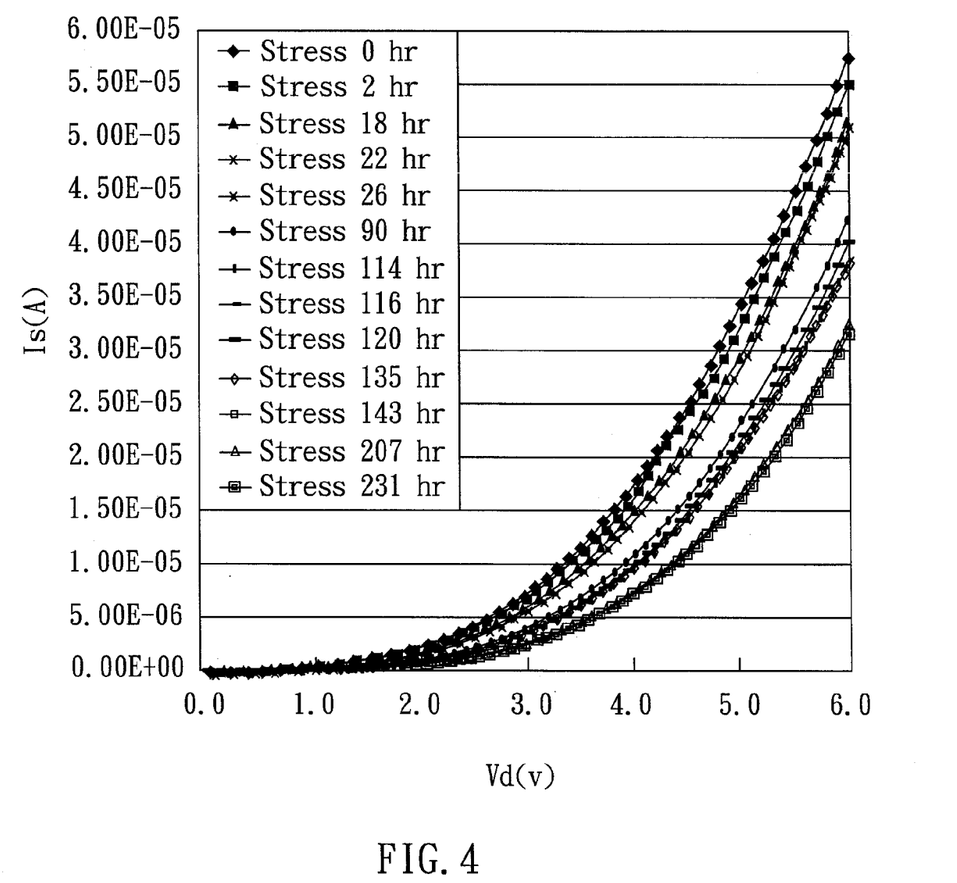
FIG. 4 is an I-V curve of a photo element when the photo element is operated at 1500 lux after variant period of times.

When the photo element is operated at office, the illumination of the environment is typically about 300 to 500 lux; when the photo element is operated at the outdoor, the illumination of the environment is typically about 1000 lux (a cloudy day) to 30000 lux (a sunny day). FIG. 3 and FIG. 4 show an I-V curve of a photo element after a long-term illumination, wherein FIG. 3 shows that the photo element is operated at indoor, dark environment, FIG. 4 shows that the photo element is operated at 1500 lux, Vd denotes voltages (unit: volt, V) given to the gate and drain of the photo thin-film transistor, and Is denotes currents (unit: ampere, A) measured at the source of the photo thin-film transistor. The bias voltage applied to the drain of the photo thin-film transistor is 2.63 V in FIG. 3 and 1.95 V in FIG. 4, and both of the FIG. 3 and FIG. 4 have the same duty cycle 1/600.

As shown in FIG. 3, when a voltage, for example, 6V, is stressed to the gate of the photo thin-film transistor for 2 hours and more, the photo-induced current is initially at 77.2 µA then decayed to 70.0 µA and maintained at 70.0 µA; therefore the reliability is acceptable when the photo element is operated at dark environment. By contrast, as shown in FIG. 4, when a voltage, for example, 6V, is stressed to the gate of the photo thin-film transistor for 231 hours, the photo-induced current is decayed about 45.28%; therefore the reliability is unacceptable when the photo element is operated at 1500 lux. The worse decay of the photo-induced current will cause the incorrect point of touch event to be determined.

Therefore, it would be advantageous to liquid crystal display device having novel photo elements that can overcome the defects of the prior art.

SUMMARY OF THE INVENTION

The object of the present invention is to provide a novel photo element and driving method thereof and a Liquid Crystal Display having the photo element that can overcome the defects of the prior art.

According to the object, the embodiments of the present invention provide a photo element, which comprises: a capacitor; a charge thin-film transistor comprising a gate and a drain connected to a first gate line and a source connected to an input terminal of the capacitor; a photo thin-film transistor for inducing a photo-induced current, the photo thin-film transistor comprising a gate and a source connected to a output terminal of the capacitor and a drain connected to a second gate line; a readout line; and a switch thin-film transistor comprising a source connected to the readout line, a gate connected to the first gate line, a drain connected to the output terminal of the capacitor and the source and the gate of the photo thin-film transistor.

According to the object, one embodiment of the present invention provides a driving method of the above-mentioned photo element, the method comprising: providing a high voltage to the first gate line to open the switch thin-film transistor and the charge thin-film transistor, whereby the first gate line provides the high voltage to the capacitor and a output voltage of the capacitor is read through the readout line; providing a low voltage to the first gate line to close the switch thin-film transistor and the charge thin-film transistor and the high voltage to the second gate line, whereby the high voltage the high voltage exerts a reverse-biased voltage stress to the photo thin-film transistor; and providing the low voltage to the first gate line and the second gate line until the end of the frame.

DESCRIPTION OF THE PREFERRED EMBODIMENT

Reference will now be made in detail to specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a through understanding of the present invention. The present invention may be practiced without some or all of these specific details. In other instances, well-known components and process operations are not described in detail in order not to unnecessarily obscure the present invention. While drawings are illustrated in details, it is appreciated that the quantity of the disclosed components may be greater or less than that disclosed, except expressly restricting the amount of the components.

The experiments of Taiwan patent application, application no. 98109166 (the specification of which is herein incorporated by reference), show that the threshold voltage of the photo thin-film transistor will be increased after long-term stressed with voltage and illumination. To resolve this problem, the present invention provides a photo element and its driving method to prevent the threshold voltage to be increased.

Figure 5A:
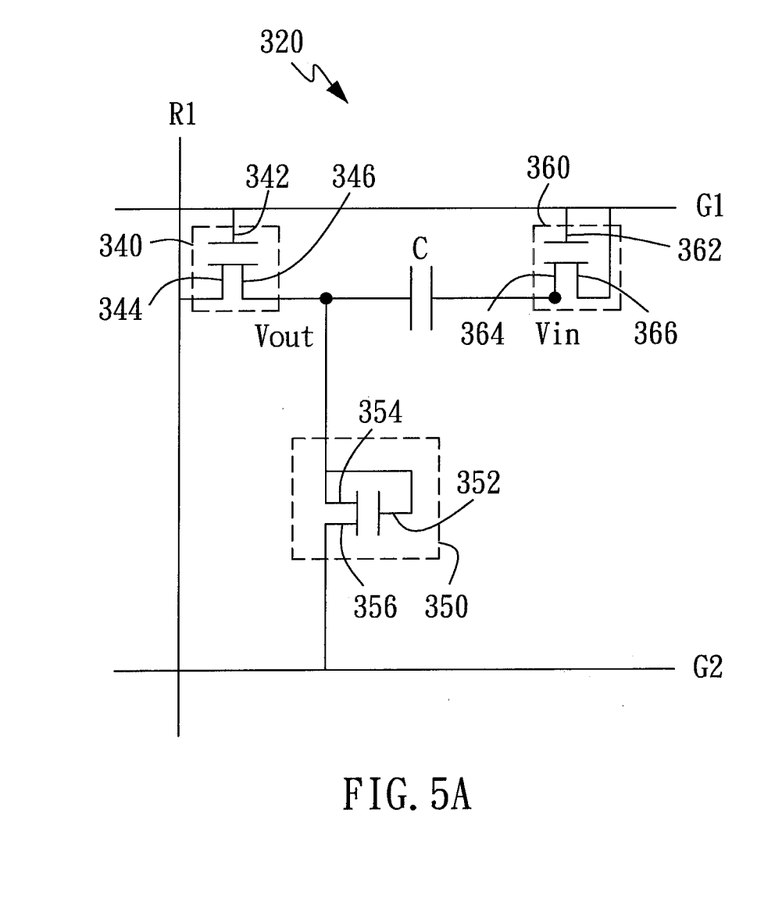
FIG. 5A and FIG. 5B respectively show a photo element and its driving method according to one embodiment of the present invention.

FIG. 5A shows a photo element 320 according to one embodiment of the present invention. The photo element 320 comprises a switch thin-film transistor 340, a photo thin-film transistor 350, a charge thin-film transistor 360, and a capacitor C. The switch thin-film transistor 340 and the charge thin-film transistor 360 may be shadowed by masking material, such as black matrix; therefore the switch thin-film transistor 340 and the charge thin-film transistor 360 are operated at dark environment, the reliability being acceptable and maintainable; by contrast, at least a portion or the whole of the photo thin-film transistor 350 is operated at illuminated environment without any masking material above it.

The switch thin-film transistor 340 comprises a source 344 connected to a readout line R1, a gate 342 connected to a first gate line G1, and a drain 346 connected to the output terminal of the capacitor C and the source 354 and the gate 352 of the photo thin-film transistor 350. The charge thin-film transistor 360 comprises a source 364 connected to the input terminal of the capacitor C and a gate 362 and a drain 366 connected to the first gate line G1. In addition, the drain 356 of the photo thin-film transistor 350 is connected to a second gate line G2. Note that in this embodiment the second gate line G2 is the next gate line of the first gate line G1, and in another embodiment the second gate line G2 may be not the next gate line of the first gate line G1. Or, alternatively, the first gate line G1 and the second gate line G2 may be replaced by other lines, such as bias lines (similarly, next to, or not next to). In addition, $V_{in}$ denotes the input voltage at the input terminal of the capacitor C, and $V_{out}$ denotes the output voltage at the output terminal of the capacitor C.

Figure 5B:
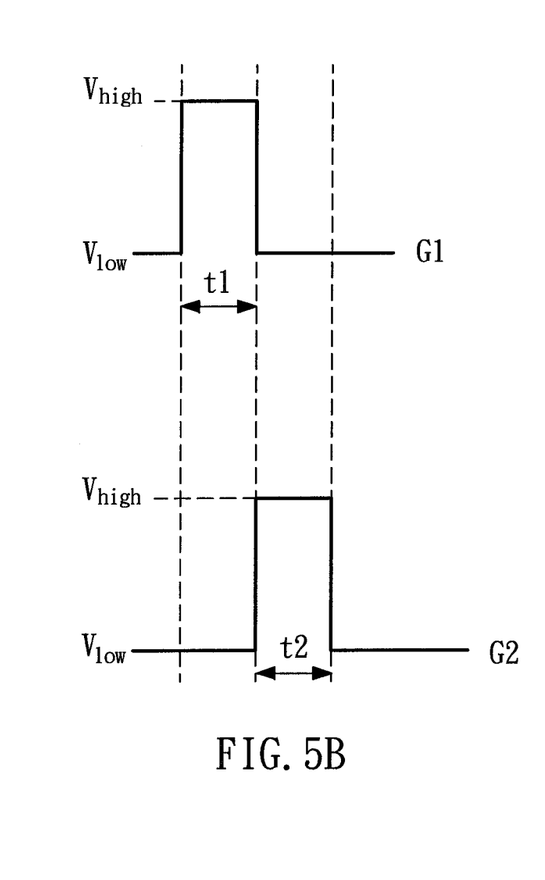

FIG. 5B illustrates a driving method of the photo element shown in FIG. 5A. The driving method comprises: at a first time period t1, providing a high voltage $V_{high}$ (such as 15V) to the first gate line G1 and a low voltage $V_{low}$ (such as −7V) to the second gate line G2; providing; at a second time period t2, providing the high voltage $V_{high}$ to the second gate line G2 and the low voltage $V_{low}$ to the second gate line G1; and then, providing the low voltage $V_{low}$ to the first gate line G1 and the second gate line G1 until the end of the current frame.

Figure 6A:
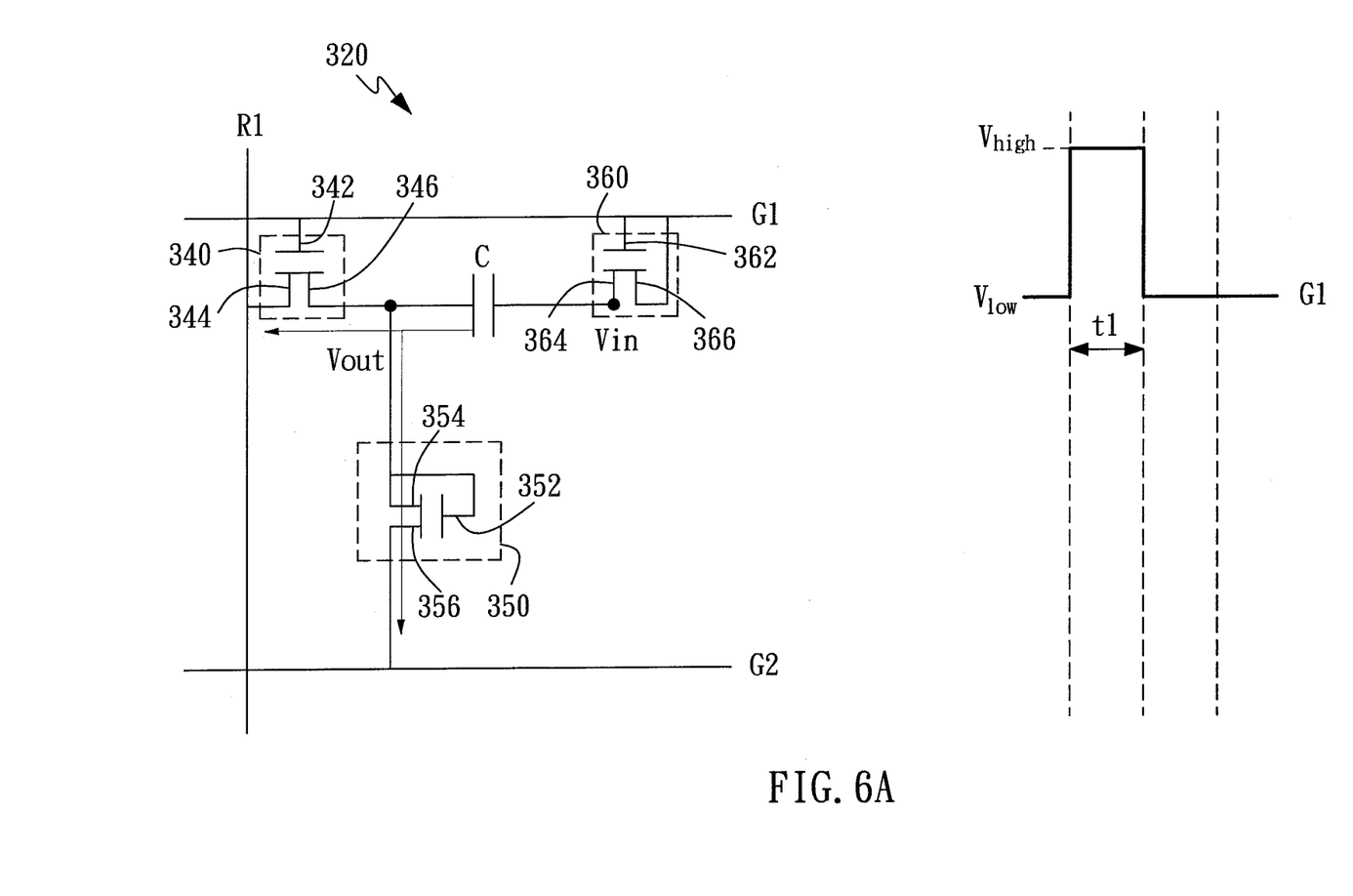
FIG. 6A to FIG. 6C respectively show the detail of the three periods of the driving method according to the embodiment of the present invention.
Figure 6B:
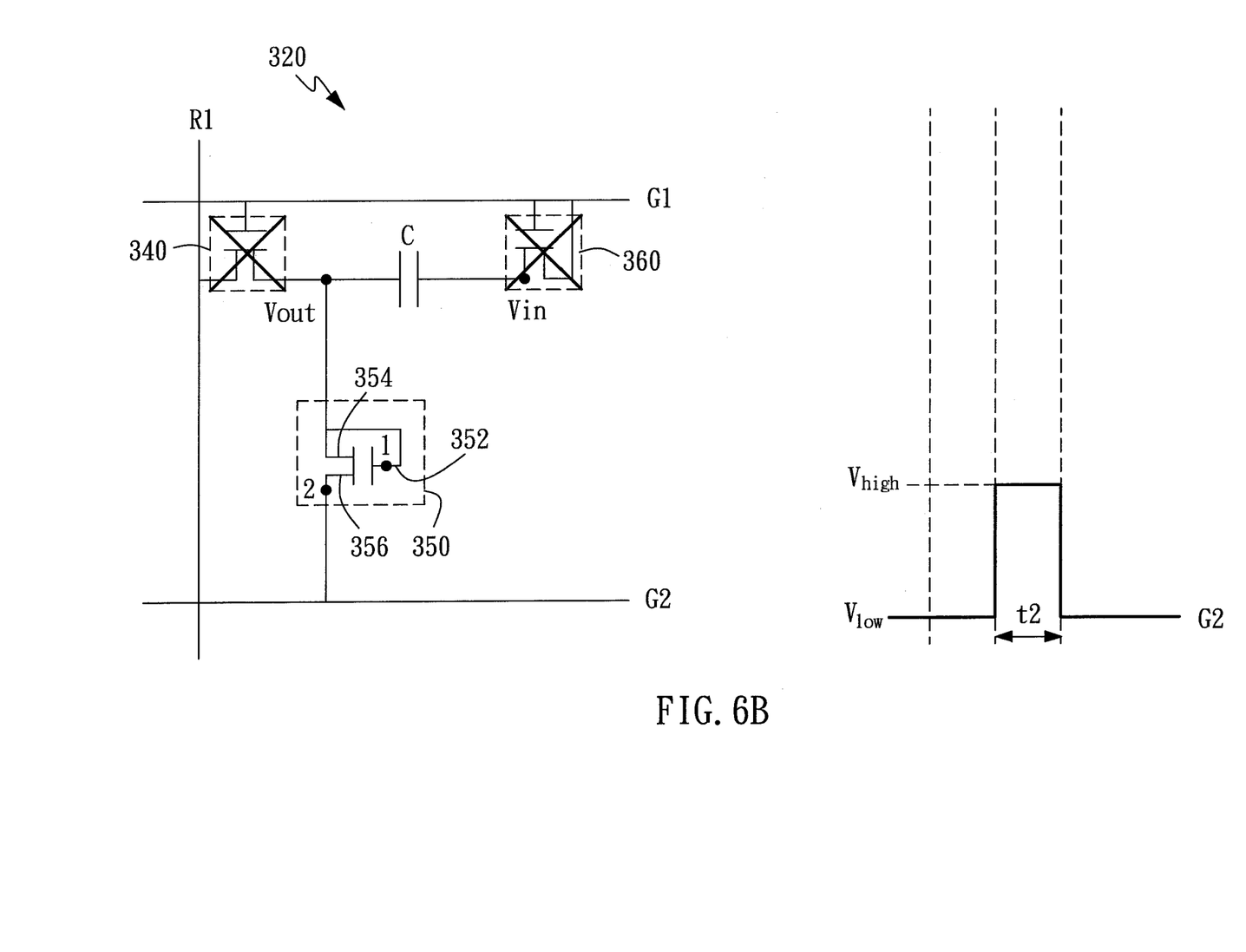
Figure 6C:
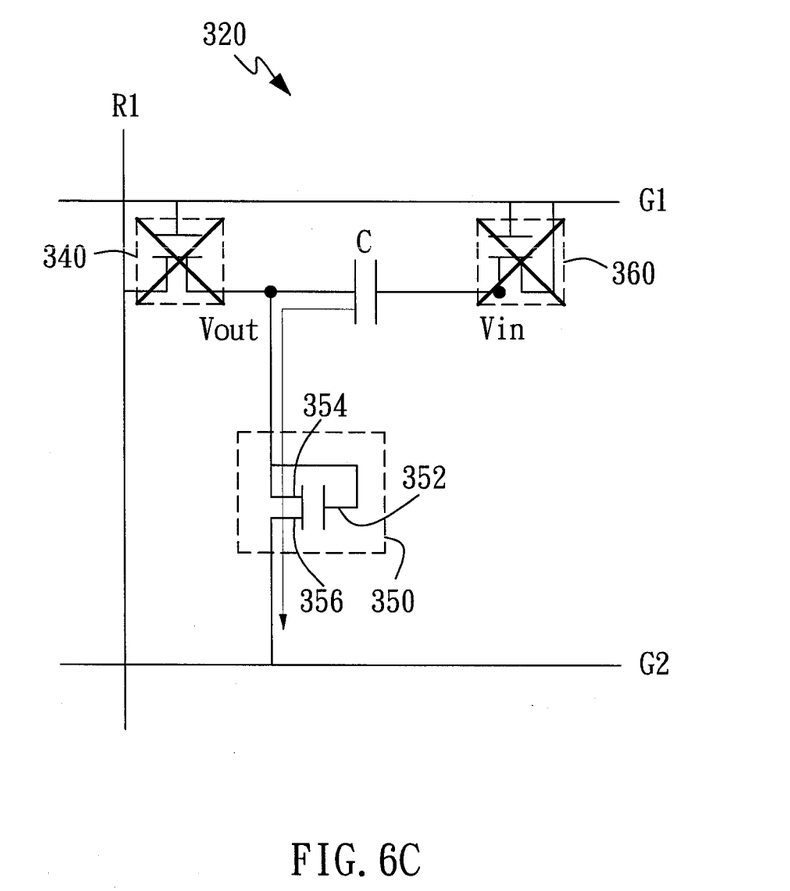

FIG. 6A to FIG. 6C show the detail of the three steps mentioned in FIG. 5B. Referring to FIG. 6A, at the first time period t1, providing the high voltage $V_{high}$ to the first gate line G1 to open the switch thin-film transistor 340 and the charge thin-film transistor 360. The high voltage $V_{high}$ is written to the capacitor C through the charge thin-film transistor 360, and the output voltage $V_{out}$ at the output terminal of the capacitor C is read out through the readout line R1. In the meantime, as the arrow shown in FIG. 6A, a current is discharged from the output terminal of the capacitor C to open the photo thin-film transistor 350; moreover, different illuminations result in different leakage currents of the photo thin-film transistor 350, and different leakage currents of the photo thin-film transistor 350 will result in different output voltages $V_{out}$, and thus whether the photo element 320 is touched by the user can be determined.

Referring to FIG. 6B, at the second time period t2, providing the high voltage $V_{high}$ to the second gate line G2 and the low voltage $V_{low}$ to the first gate line G1. In this period, because the low voltage $V_{low}$ provided the first gate line G1 is insufficient to open the charge thin-film transistor 360 and the switch thin-film transistor 340, the output voltage $V_{out}$ at the output terminal of the capacitor C is substantially maintained at a constant value $V_a$. In the meantime, the high voltage $V_{high}$ is exerted to point 2, causing that the potential of point 1 is less than the potential of point 2, and a reverse-biased stress is exerted to the photo thin-film transistor 350. The photo thin-film transistor 350 can be compensated by the reverse-biased stress; therefore its threshold voltage will not be increased and its photo-induced current will not be decayed.

Referring to FIG. 6C, in this period, providing the low voltage $V_{low}$ to the first gate line G1 and the second gate line G2 until the end of the current frame. In addition, the other gate lines such as G3, G4 . . . (not show) are opened in sequence. Therefore, the charge thin-film transistor 360 and the switch thin-film transistor 340 remain closed in this period, and a discharge current (as show as the arrow in FIG. 6C) is discharged from the capacitor C to open the photo thin-film transistor 350. The capacitor C continually discharges the current until the potential of the output terminal $V_{out}$ equals the potential of the second gate line G2, i.e., $V_{low}$.

Figure 7:
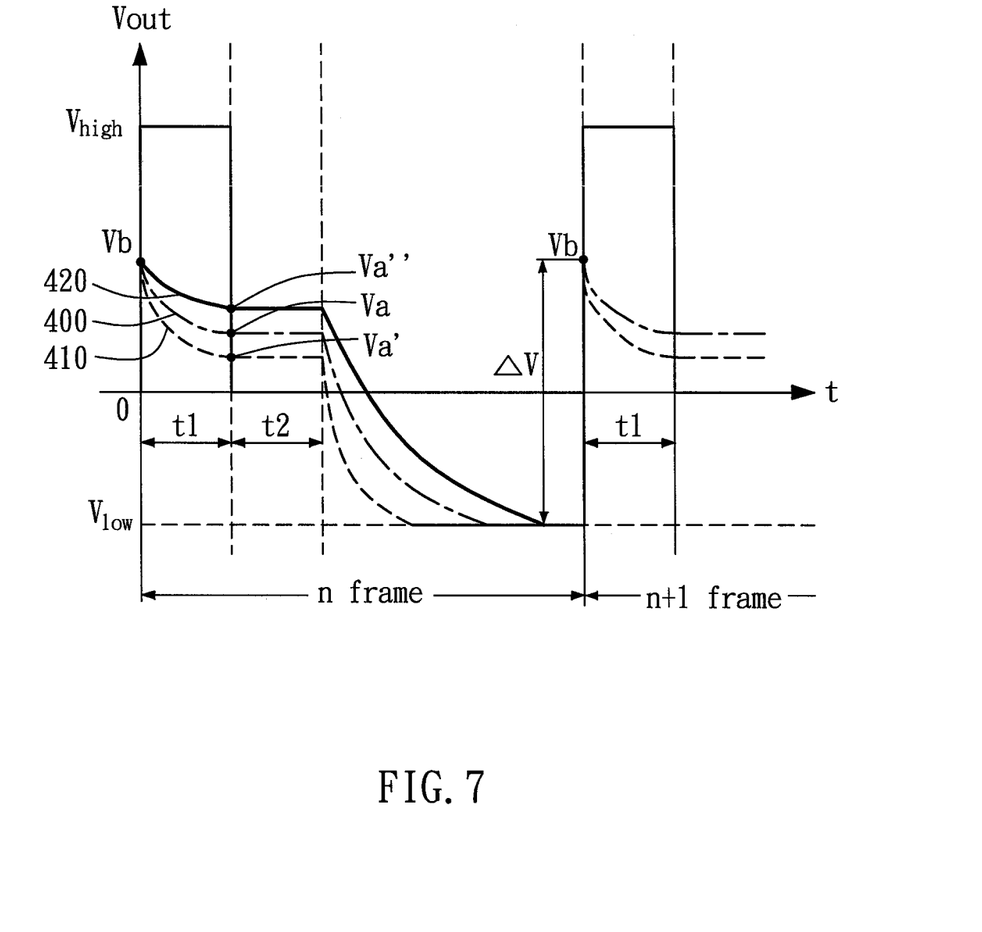
FIG. 7 shows the variance of the output voltage during the three periods of one frame.

FIG. 7 shows the variance of the output voltage $V_{out}$ during the three periods of one frame, for example, the $n^{th}$ frame, where curve 400 shows the variance of the output voltage $V_{out}$ of the photo element 320 illuminated with a reference illumination, such as 1500 lux; curve 410 shows the variance of the output voltage $V_{out}$ of the photo element 320 illuminated with an illumination brighter than the reference illumination, such as 15000 lux; and curve 420 shows the variance of the output voltage $V_{out}$ of the photo element 320 illuminated with an illumination darker than the reference illumination, such as 5 lux or a dark environment. In addition, ΔV denotes the potential difference written to the capacitor C, and hence the output voltage $V_{out}$ at the output terminal of the capacitor C has an initial value $V_b$ that equals $V_{low}$ plus the potential difference ΔV ($V_b=V_{low}+\Delta V$). After the first time period t1, the output voltage $V_{out}$ is decreased to $V_a$ with the reference illumination, decreased to $V_a'$ with the brighter illumination, and decreased to $V_a''$ with the darker illumination. The different illuminations result in different photo-induced currents, the different photo-induced currents result in different output voltages, and the different output voltages—such as $V_a'$ and $V_a''$—can be employed to determine whether the photo element 320 is touched by user's finger or a stylus, where the different voltages such as $V_a'$ and $V_a''$ are read through the readout line R1 (see FIG. 5A). From the end of the second time period t2 to the end of the current frame ($n^{th}$ frame), the capacitor C will discharge current until the output voltage $V_{out}$ equals the low voltage $V_{low}$. At the next frame (the $n+1^{th}$ frame), the above-mentioned three periods will be repeated again. Taking a display with frame rate 60 Hz as an example, the period of one frame will be ⅟60=16.67 ms. Hence all gate lines will be opened in sequence per 16.67 ms, and voltages can be written into pixels by data lines.

Figure 8:
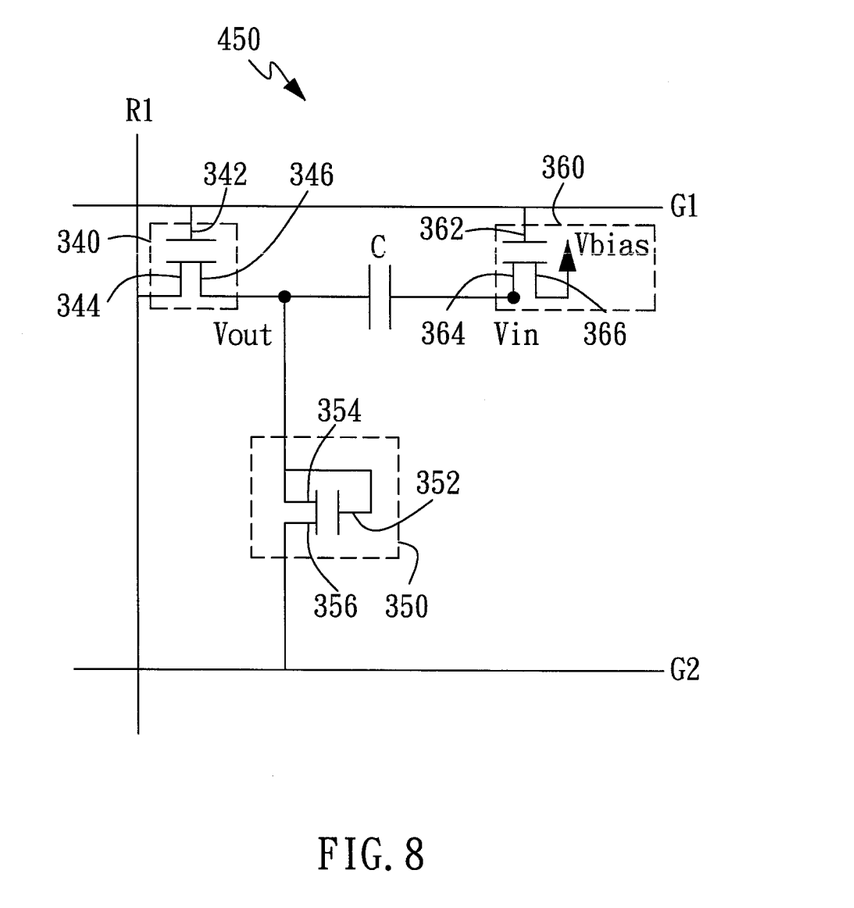
FIG. 8 shows a photo element according to another embodiment of the present invention.

FIG. 8 shows a photo element 450 according to another embodiment of the present invention. The difference between the photo element 450 and photo element 320 is that the drain 366 of the charge thin-film transistor 360 of the former is connected to a bias line $V_{bias}$ rather than connected to the first gate line G1, and hence the voltage written to the capacitor C is provided by the bias line $V_{bias}$ rather than the first gate line G1.

The photo element of the present invention may be applied to a Liquid Crystal Display, which comprises a thin-film transistor substrate, which comprises a plurality of gate lines and a plurality of data lines where a plurality of pixels are defined, and a plurality of photo elements of the present invention are regularly arranged in some or all of the plurality of pixels, thereby forming a plurality of readout pixels.

Figure 9:
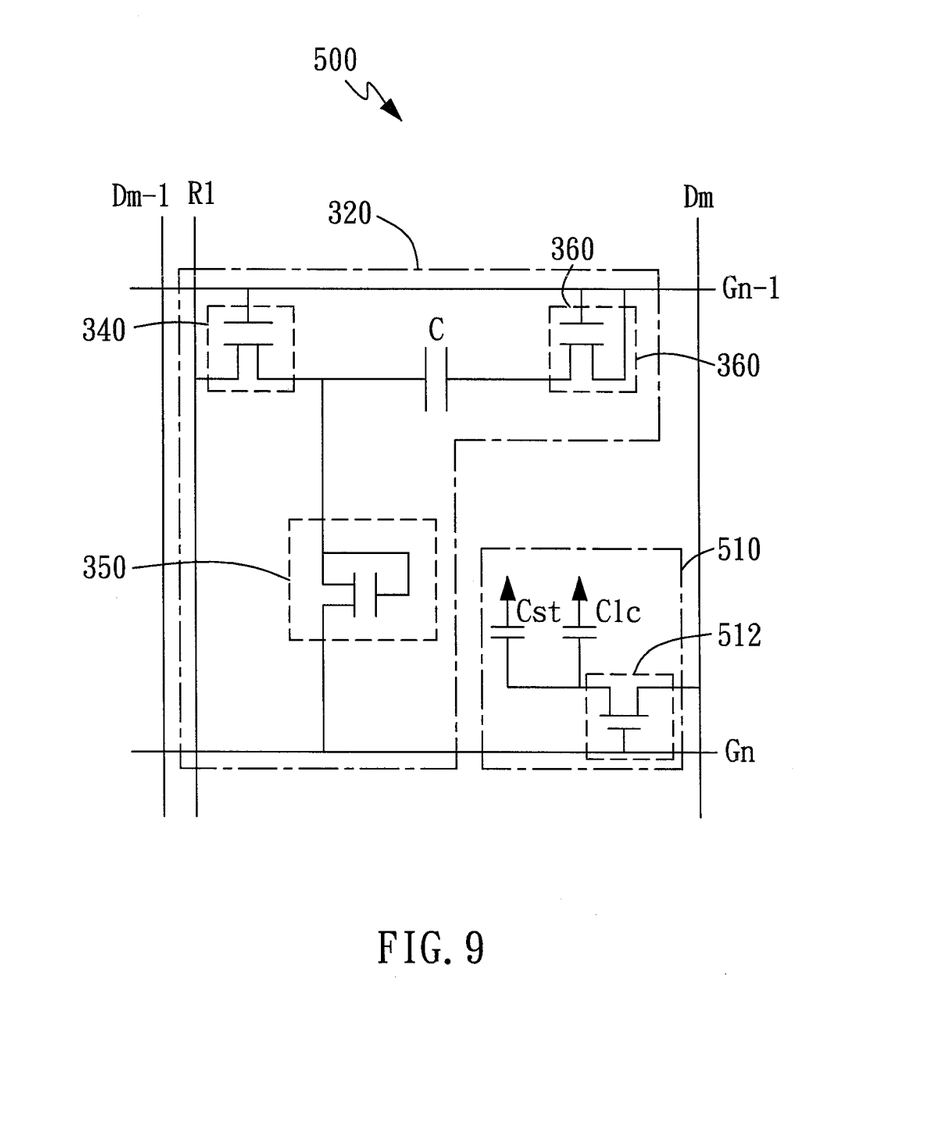
FIG. 9 illustrate a readout pixel that employs the photo element of FIG. 5A according to one embodiment of the present invention.

FIG. 9 illustrate a readout pixel 300 that employs the photo element of FIG. 5A according to one embodiment of the present invention. The readout pixel 500 comprises a pixel element 510 and an above-mentioned photo element 320. The structure of the pixel element 510 may be the same as any prior art; the description of it is omitted. In this embodiment, the first gate line G1 corresponds to gate line Gn-1, and the second gate line 251 corresponds to gate line Gn. The pixel element 510 comprises a pixel thin-film transistor 512, and the pixel thin-film transistor 512 comprises a gate connected to the gate line Gn and a source connected to the data line Dm. In another embodiment of the present invention, the gate of the pixel thin-film transistor 512 is connected to the gate line Gn-1, and/or the source of the pixel thin-film transistor 512 is connected to the data line Dm-1. In addition, the other embodiments of the present invention may employ the photo element of FIG. 8 in a similar way to form readout pixels.

Although specific embodiments have been illustrated and described, it will be appreciated by those skilled in the art that various modifications may be made without departing from the scope of the present invention, which is intended to be limited solely by the appended claims.

What is claimed is:

1. A driving method of a photo element, the photo element comprising a capacitor, a charge thin-film transistor, a photo thin-film transistor, a readout line, and a switch thin-film transistor, the gate of the charge thin-film transistor being connected to a first gate line, the drain of the charge thin-film transistor being connected to the first gate line, the source of the charge thin-film transistor being connected to an input terminal of the capacitor, the drain of the photo thin-film transistor being connected to a second gate line, the source and the gate of the photo thin-film transistor being connected to a output terminal of the capacitor, the source of the switch thin-film transistor being connected to the readout line, the gate of the switch thin-film transistor being connected to a first gate line, and the drain of the switch thin-film transistor being connected to the output terminal of the capacitor and the source and the gate of the photo thin-film transistor, during a frame the driving method comprising the steps of:

providing a high voltage to the first gate line to open the switch thin-film transistor and the charge thin-film transistor, whereby the first gate line provides the high voltage to the capacitor and a output voltage of the capacitor is read through the readout line;

providing a low voltage to the first gate line to close the switch thin-film transistor and the charge thin-film transistor and the high voltage to the second gate line, whereby the high voltage applied a reverse-biased voltage to the photo thin-film transistor; and providing the low voltage to the first gate line and the second gate line until the end of the frame.

2. A photo element, comprising:

a capacitor;

a charge thin-film transistor comprising a gate and a drain connected to a first gate line and a source connected to an input terminal of the capacitor;

a photo thin-film transistor comprising a gate and a source connected to a output terminal of the capacitor and a drain connected to a second gate line;

a readout line; and a switch thin-film transistor comprising a source connected to the readout line, a gate connected to the first gate line, a drain connected to the output terminal of the capacitor and the source and the gate of the photo thin-film transistor.

3. A Liquid Crystal Display, comprising:

a thin-film transistor substrate, the thin-film transistor substrate comprising a plurality of gate lines and a plurality of data lines where a plurality of pixels are defined, and a plurality of photo elements are arranged in some or all of the plurality of pixels, thereby forming a plurality of readout pixels, wherein each of the plurality of photo elements comprises:

a capacitor;

a charge thin-film transistor comprising a gate connected to a first gate line, a drain connected to the first gate line, and a source connected to an input terminal of the capacitor;

a photo thin-film transistor for inducing a photo-induced current, the photo thin-film transistor comprising a gate and a source connected to a output terminal of the capacitor and a drain connected to a second gate line;

a readout line; and a switch thin-film transistor comprising a source connected to the readout line, a gate connected to the first gate line, a drain connected to the output terminal of the capacitor and the source and the gate of the photo thin-film transistor.

4. The Liquid Crystal Display as recited in claim 3, wherein the second gate line is the next gate line of the first gate line.

5. The Liquid Crystal Display as recited in claim 3, wherein the second gate line is not the next gate line of the first gate line.

6. The driving method as recited in claim 2, wherein a plurality of the photo elements are arranged in a thin-film transistor substrate of a Liquid Crystal Display, the thin-film transistor substrate comprising a plurality of gate lines and a plurality of data lines where a plurality of pixels are defined, and the plurality of the photo elements are arranged in some or all of the plurality of pixels, thereby forming a plurality of readout pixels.

7. The photo element as recited in claim 2, wherein a high voltage is provided to the first gate line to open the switch thin-film transistor and the charge thin-film transistor at a first time period during a frame, whereby the high voltage is written into the capacitor, a output voltage at the output terminal of the capacitor is read through the readout line, the output voltage is affected by the photo induced current, and whether the photo element is touched will be determined.

8. The photo element as recited in claim 7, wherein after the first time period, a low voltage is provided to the first gate line to close the switch thin-film transistor and the charge thin-film transistor and the high voltage is provided to the second gate line at a second time period during the frame, and the second gate line exerts a reverse-biased voltage stress to the photo thin-film transistor.

9. The photo element as recited in claim 8, wherein after the second time period, the low voltage is provided to the first gate line and the second gate line until the end of the frame.

10. The photo element as recited in claim 2, wherein the second gate line is the next gate line of the first gate line.

11. The photo element as recited in claim 2, wherein the second gate line is not the next gate line of the first gate line.

12. The photo element as recited in claim 2, wherein a plurality of the photo elements are arranged in a thin-film transistor substrate of a Liquid Crystal Display, the thin-film transistor substrate comprising a plurality of gate lines and a plurality of data lines where a plurality of pixels are defined, and the plurality of the photo elements are arranged in some or all of the plurality of pixels, thereby forming a plurality of readout pixels.

* * * * *